United States Patent
Hieda

(10) Patent No.: US 8,336,059 B2
(45) Date of Patent: Dec. 18, 2012

(54) ACCESS RIGHT CHECKING SYSTEM, ACCESS RIGHT CHECKING METHOD, AND ACCESS RIGHT CHECKING PROGRAM

(75) Inventor: Satoshi Hieda, Tokyo (JP)

(73) Assignee: NEC Corporation, Tokyo (JP)

( * ) Notice: Subject to any disclaimer, the term of this patent is extended or adjusted under 35 U.S.C. 154(b) by 1328 days.

(21) Appl. No.: 11/909,299

(22) PCT Filed: Mar. 24, 2006

(86) PCT No.: PCT/JP2006/305957
§ 371 (c)(1),
(2), (4) Date: Sep. 21, 2007

(87) PCT Pub. No.: WO2006/101194
PCT Pub. Date: Sep. 28, 2006

(65) Prior Publication Data
US 2009/0055840 A1    Feb. 26, 2009

(30) Foreign Application Priority Data
Mar. 24, 2005 (JP) .................. 2005-086320

(51) Int. Cl.
G06F 9/44     (2006.01)
G06F 7/04     (2006.01)
H04L 29/06    (2006.01)
(52) U.S. Cl. ................ 719/319; 713/164; 726/29
(58) Field of Classification Search ............ 713/164; 726/29; 719/319
See application file for complete search history.

(56) References Cited

U.S. PATENT DOCUMENTS

| | | | | |
|---|---|---|---|---|
| 5,761,669 A | * | 6/1998 | Montague et al. | 707/758 |
| 6,298,390 B1 | * | 10/2001 | Matena et al. | 719/315 |
| 7,035,850 B2 | * | 4/2006 | Arai et al. | 1/1 |
| 2001/0025311 A1 | * | 9/2001 | Arai et al. | 709/225 |

(Continued)

FOREIGN PATENT DOCUMENTS

JP    10-021099 A    1/1998

(Continued)

OTHER PUBLICATIONS

Masato Arai, shin' ichi Sasaki et al., "Multi OS Kankyo o Riyoshita Access Seigyo System no Jisso to Seino Hyoka", Transactions of Information Processing Society of Japan, vol. 44, No. 4, Apr. 15, 2003, pp. 1092 to 1100.

(Continued)

Primary Examiner — Charles E Anya
(74) Attorney, Agent, or Firm — Sughrue Mion, PLLC

(57) ABSTRACT

An access right checking method conducts an access right check on a request destination OS (Operating System) according to a right of a subject executed on a requestor OS when the subject issues an access request to access the object, the subject being an access main body on the requestor OS. A first step causes the request destination OS to execute the access request from the requestor OS on the request destination OS by proxy. A second step causes the request destination OS to acquire the subject information on the subject executed on the requestor OS. A third step causes the request destination OS to convert the subject information to be allocated to access request proxy means. A fourth step causes the request destination OS to check whether the access request at the second step has a right to access the object.

12 Claims, 10 Drawing Sheets

U.S. PATENT DOCUMENTS

2003/0221115 A1* 11/2003 Itoh et al. ............... 713/189
2006/0085839 A1* 4/2006 Brandt et al. ............... 726/2

FOREIGN PATENT DOCUMENTS

| JP | 11-282805 A | 10/1999 |
| JP | 2001-101054 A | 4/2001 |
| JP | 2001-337864 A | 12/2001 |
| JP | 2002-149494 A | 5/2002 |
| JP | 2002-318719 A | 10/2002 |
| JP | 2003-345654 A | 12/2003 |
| JP | 2007-034341 A | 2/2007 |

OTHER PUBLICATIONS

Security-Enhanced Linux URL: http://nsa.gov/selinux/.
The User-mode Kernel HomePage URL: http://user-mode-linux.sourceforge.net/.

* cited by examiner

FIG.10

```
/usr/bin/app1,11
/usr/bin/app2,12
/usr/local/bin/app3,13
/usr/local/bin/app4,14
(FIRST COLUMN MEANS EXECUTION PATH OF APPLICATION
PROCESS ON REQUESTOR OS, AND SECOND COLUMN MEANS
SID ALLOCATED TO APPLICATION PROCESS)
```

ACCESS RIGHT CHECKING SYSTEM, ACCESS RIGHT CHECKING METHOD, AND ACCESS RIGHT CHECKING PROGRAM

TECHNICAL FIELD

The present invention relates to an access right checking system, an access right checking method, and an access right checking program, and particularly relates to an access right checking system, an access right checking method, and an access right checking program for between different OS, i.e., an access requester OS and an access request destination OS.

BACKGROUND ART

In the environment in which a plurality of information processing apparatuses is connected to one another by a network, an access request can be executed among different OS (Operating Systems) via an NFS (Network File System) or Samba.

The "access request" means herein that "a subject (a process or a thread) that is an access main body accesses an object (a file, a directory, a heap, a stack, a semaphore, FIFO (First-In First-Out), a message, or a computer resource such as a shared memory or a socket).

Namely, if the above-stated environment is considered, in the environment in which Windows® is installed into one information processing apparatus and Linux is installed into another information processing apparatus, a process on Windows® is accessible to a file on Linux via Samba.

Furthermore, even if only one information processing apparatus is present, an access request can be executed between a guest OS and a host OS by constructing a virtual machine environment in the apparatus.

For example, in a UML (User-Mode Linux) environment, a process executed on UML is accessible to a file on host Linux via Host Filesystem.

However, if a subject on a requester OS makes an illegal access to a resource on a request destination OS using this access request between the different OS, the request destination OS may possibly malfunction.

In the UML environment, for example, if a process operating on the UML illegally tamper with a system file on the host Linux, the host Linux may possibly malfunction.

To solve such a problem, it is necessary to provide an access right checking system that can verify whether an access request from a subject on the requester OS to access an object on the request destination OS is legal. Demand of an access right checking system satisfying the following three requirements particularly rises.

As a first requirement, the access right checking system is required to be able to conduct an access right check according to a type of a right of the subject operating on the requester OS.

For example, the access right checking system is required as follows. The right of a process executed on the requester OS can be set by authority of a system administrator so as to be able to write data to many files on the request destination OS. In addition, the right of the process executed on the request destination OS can be set by authority of an ordinary user so as to be able to approve reading only a few files.

A second requirement is as follows. As security measures, an access right checking system is often already installed into the request destination OS. Due to this, it is required that the access right checking system can deal with an access request from the requester OS only by modifying the existing access right checking system using the existing access right checking system.

A third requirement is as follows. The access right checking system that can conduct access right checks of all subjects on the requester OS is required.

It is necessary to conduct the access right checks in response to access requests from the respective subjects on the requester OS to access objects on the request destination OS.

In a conventional access right checking system of this type, to prohibit an illegal access to an object from a subject in one OS, when the subject accesses the object, it is verified whether the access is effective based on an access policy prepared in advance in the OS, only an approved access is executed and a disapproved access is not executed as disclosed in, for example, Patent Document 1 and Non-Patent Document 1.

This access right checking system satisfies the third requirement stated above.

Moreover, in the conventional access right checking system of this type, to prohibit an illegal access to an object from a subject between a plurality of OS, access right checking means 207 and an access policy are separately prepared in a communication unit of each OS, the access right checking means 207 verifies whether an access from the subject on the requester OS to the object on the request destination OS is effective based on the access policy when the access occurs, only an approved access is executed, and a disapproved access is not executed, as disclosed in, for example, Patent Document 2.

This access right checking system satisfies the first and third requirements.

Furthermore, in the conventional access right checking system of this type, to prohibit an illegal access from a user on UML (User-mode Linux) to a file on Host Filesystem in the Linux-oriented virtual machine environment, if the user on the UML is to access the file on the Host Filesystem, then a permission to the access target file is checked, only an access coincident with the permission is executed, and an access that is not coincident with the permission is not executed, as disclosed in Non-Patent Document 2.

This access right checking system satisfies the second requirement.

Patent Document 1: JP-A-2002-149494
Patent Document 2: JP-A-2003-345654
Non-Patent Document 1: Security-Enhanced Linux URL: http://nsa.gov/selinux/
Non-Patent Document 2: The User-mode Kernel HomePage URL: http://user-mode-linux.sourceforge.net/

DISCLOSURE OF THE INVENTION

The first problem is that information on a subject executed on the requester OS cannot be referred to from the request destination OS.

This is because the information on the subject executed on the requester OS is entirely managed in the requestor OS.

For example, even if a plurality of processes is executed on UML while the UML is made to run on Linux, information on the processes is all managed in a kernel of the UML and the Linux of the request destination OS cannot directly refer to the information on the respective processes.

The second problem is that the requester OS cannot conduct an access right check based on information on the subject executed on the requester OS.

The reason is the same as that for the first problem.

The third problem is that the requester OS cannot conduct access right checks of all access requests on the request OS based on information on the subject executed on the requester OS.

The reason is the same as that for the first problem.

If these problems are solved, an access control checking system that satisfies the three requirements for the access right checking system stated in Background Art section can be constructed.

OBJECT OF THE INVENTION

It is an object of the present invention to provide an access right checking system, an access right checking method, and an access right checking program that enable information on a subject executed on a requester OS to be referred to from a request destination OS.

It is another object of the present invention to provide an access right checking system, an access right checking method, and an access right checking program capable of conducting an access right check on a requester OS based on information on a subject executed on the requester OS.

It is yet another object of the present invention to provide an access right checking system, an access right checking method, and an access right checking program capable of conducting an access right check of all access requests on a requester OS based on information on a subject executed on the requester OS.

As means for solving the above-stated problems, the present invention is characterized by conducting an access right check on a request destination OS according to a right of a subject executed on a requester OS when the subject issues an access request to access the object, the subject being an access main body on the requester OS, the object being an access target on the request destination OS.

The present invention is characterized in that the request destination OS inquiries the requester OS of subject information on the subject.

The present invention is characterized in that the request destination OS includes access request proxy means for executing the access request from the requester OS on the request destination OS by proxy; subject information acquisition means for acquiring the subject information on the subject executed on the requester OS when the access request proxy means issues the access request; a subject information conversion database in which subject information to be allocated to the access request proxy means is described for every type of the subject executed on the requester OS; subject information conversion means for converting the subject information to be allocated to the access request proxy means by comparing the subject information on the subject executed on the requester OS and acquired by the subject information acquisition means with the subject information conversion database; and access right checking means for checking whether the access request proxy means has a right to access the object based on the subject information allocated to the access request proxy means and obtained by conversion by the subject information conversion means and on object information on the object serving as the access target.

The present invention is characterized in that the requester OS notifies the request destination OS of the subject information on the subject that issues the access request.

The present invention is characterized in that the requester OS includes access processing means for adding the subject information on the subject that issues the access request to the access request and for notifying the request destination OS of the access request when receiving the access request from the subject, and in that the request destination OS includes access request proxy means for storing the subject information on the subject included in the access request in a subject information storage unit when the request destination OS receives the access request from the requester OS, and for executing the access request from the requester OS on the request destination OS by proxy; subject information acquisition means for acquiring the subject information on the subject executed on the requester OS from the subject information storage unit when the access request proxy means issues the access request; a subject information conversion database in which subject information to be allocated to the access request proxy means is described for every type of the subject executed on the requester OS; subject information conversion means for converting the subject information to be allocated to the access request proxy means by comparing the subject information on the subject executed on the requester OS and acquired by the subject information acquisition means with the subject information conversion database; and access right checking means for checking whether the access request proxy means has a right to access the object based on the subject information allocated to the access request proxy means and obtained by conversion by the subject information conversion means and on object information on the object serving as the access target.

The present invention is characterized in that the requester OS includes subject information notification means for storing the subject information on the subject executed after switching of the subject in a subject information storage unit on the request destination OS whenever an operation for switching the subject executed occurs in the requester OS, and in that the request destination OS includes access request proxy means for executing the access request from the requester OS on the request destination OS by proxy; subject information acquisition means for acquiring the subject information on the subject executed on the requester OS from the subject information storage unit when the access request proxy means issues the access request; a subject information conversion database in which subject information to be allocated to the access request proxy means is described for every type of the subject executed on the requester OS; subject information conversion means for converting the subject information to be allocated to the access request proxy means by comparing the subject information on the subject executed on the requestor OS and acquired by the subject information acquisition means with the subject information conversion database; and access right checking means for checking whether the access request proxy means has a right to access the object based on the subject information allocated to the access request proxy means and obtained by conversion by the subject information conversion means and on object information on the object serving as the access target.

The present invention is characterized in that the requester OS and the request destination OS are caused to run on one information processing apparatus.

The present invention is characterized in that the requester OS and the request destination OS are caused to run on different information processing apparatuses, respectively.

Furthermore, the present invention is characterized by conducting an access right check on a request destination OS according to a right of a subject executed on a requester OS when the subject issues an access request to access the object, the subject being an access main body on the requester OS, the object being an access target on the request destination OS.

The present invention is characterized in that the request destination OS inquiries the requester OS of subject information on the subject.

The present invention is characterized by comprising: a first step of causing the request destination OS to execute the access request from the requester OS on the request destination OS by proxy; a second step of causing the request destination OS to acquire the subject information on the subject executed on the requester OS when the access request is issued at the first step; a third step of causing the request destination OS to convert the subject information to be allocated to access request proxy means by comparing the subject information on the subject executed on the requester OS and acquired at the second step with the subject information conversion database; and a fourth step of causing the request destination OS to check whether the access request at the second step has a right to access the object based on the subject information on the access request at the first step and obtained by conversion at the third step and on object information on the object serving as the access target.

The present invention is characterized in that the requester OS notifies the request destination OS of the subject information on the subject that issues the access request.

The present invention is characterized by comprising: a first step of causing the requester OS to add the subject information on the subject that issues the access request to the access request and for notifying the request destination OS of the access request when the requester OS receives the access request from the subject; a second step of causing the request destination OS to store the subject information on the subject included in the access request in a subject information storage unit when the request destination OS receives the access request from the requester OS, and to execute the access request from the requester OS on the request destination OS by proxy; a third step of causing the request destination OS to acquire the subject information on the subject executed on the requester OS from the subject information storage unit when the access request is issued at the second step; a fourth step of causing the request destination OS to convert the subject information to be allocated to access request proxy means by comparing the subject information on the subject executed on the requester OS and acquired at the third step with the subject information conversion database; and a fifth step of causing the request destination OS to check whether the access request at the second step has a right to access the object based on the subject information on the access request at the second step and obtained by conversion at the fourth step and on object information on the object serving as the access target.

The present invention is characterized by comprising: a first step of causing the requester OS to store the subject information on the subject executed after switching of the subject in a subject information storage unit on the request destination OS whenever an operation for switching the subject executed occurs in the requester OS; a second step of causing the request destination OS to execute the access request from the requester OS on the request destination OS by proxy; a third step of causing the request destination OS to acquire the subject information on the subject executed on the requester OS from the subject information storage unit when the access request is issued at the second step; a fourth step of causing the request destination OS to convert the subject information to be allocated to the access request proxy means by comparing the subject information on the subject executed on the requester OS and acquired at the third step with the subject information conversion database; and a fifth step of causing the request destination OS to check whether the access request has a right to access the object based on the subject information on the access request at the second step and obtained by conversion at the fourth step and on object information on the object serving as the access target.

The present invention is characterized in that the requester OS and the request destination OS are caused to run on one information processing apparatus.

The present invention is characterized in that the requester OS and the request destination OS are caused to run on different information processing apparatuses, respectively.

The present invention is characterized by conducting an access right check on a request destination OS according to a right of a subject executed on a requester OS when the subject issues an access request to access the object, the subject being an access main body on the requester OS, the object being an access target on the request destination OS.

The present invention is characterized in that the request destination OS inquiries the requester OS of subject information on the subject.

The present invention is characterized by comprising: a first processing of causing the request destination OS to execute the access request from the requester OS on the request destination OS by proxy; a second processing of causing the request destination OS to acquire the subject information on the subject executed on the requester OS when the access request is issued by the first processing; a third processing of causing the request destination OS to convert the subject information to be allocated to access request proxy means by comparing the subject information on the subject executed on the requester OS and acquired by the second processing with the subject information conversion database; and a fourth processing of causing the request destination OS to check whether the access request by the second processing has a right to access the object based on the subject information on the access request by the first processing and obtained by conversion by the third processing and on object information on the object serving as the access target.

The present invention is characterized in that the requester OS notifies the request destination OS of the subject information on the subject that issues the access request.

The present invention is characterized by comprising: a first processing of causing the requester OS to add the subject information on the subject that issues the access request to the access request and for notifying the request destination OS of the access request when the requester OS receives the access request from the subject; a second processing of causing the request destination OS to store the subject information on the subject included in the access request in a subject information storage unit when the request destination OS receives the access request from the requester OS, and to execute the access request from the requester OS on the request destination OS by proxy; a third processing of causing the request destination OS to acquire the subject information on the subject executed on the requester OS from the subject information storage unit when the access request is issued by the second processing; a fourth processing of causing the request destination OS to convert the subject information to be allocated to access request proxy means by comparing the subject information on the subject executed on the requester OS and acquired by the third processing with the subject information conversion database; and a fifth processing of causing the request destination OS to check whether the access request by the second processing has a right to access the object based on the subject information on the access request by the second processing and obtained by conversion by the fourth processing and on object information on the object serving as the access target.

The present invention is characterized by comprising: a first processing of causing the requester OS to store the subject information on the subject executed after switching of the subject in a subject information storage unit on the request destination OS whenever an operation for switching the subject executed occurs in the requester OS; a second processing of causing the request destination OS to execute the access request from the requester OS on the request destination OS by proxy; a third processing of causing the request destination OS to acquire the subject information on the subject executed on the requester OS from the subject information storage unit when the access request is issued by the second processing; a fourth processing of causing the request destination OS to convert the subject information to be allocated to the access request proxy means by comparing the subject information on the subject executed on the requester OS and acquired by the third processing with the subject information conversion database; and a fifth processing of causing the request destination OS to check whether the access request has a right to access the object based on the subject information on the access request by the second processing and obtained by conversion by the fourth processing and on object information on the object serving as the access target.

The present invention is characterized in that the requester OS and the request destination OS are caused to run on one information processing apparatus.

The present invention is characterized in that the requester OS and the request destination OS are caused to run on different information processing apparatuses, respectively.

EFFECT OF THE INVENTION

A first effect is that the access right of the subject on the requester OS can be set in more detail as compared with the conventional technique.

As a result, a system administrator of the request destination OS can give a detailed access right to each of even subjects on the requester OS.

The reason is that the subject information to be allocated to each subject on the requester OS can be set in the subject information conversion database.

A second effect is as follows. Even if security vulnerability of the requester OS is exploited to abuse the right of a rightful person of the requester OS and an illegal access is made to the object, it is possible to minimize damage because the access right check according to the present patent is grounded on the subject information regardless of the user.

The reason is that information on the subject executed on the requester OS can be referred to from the request destination OS.

BRIEF DESCRIPTION OF THE DRAWINGS

FIG. 10 is a view showing a specific example of a subject information conversion database 207.

DESCRIPTION OF REFERENCE NUMERALS

Figure 1:
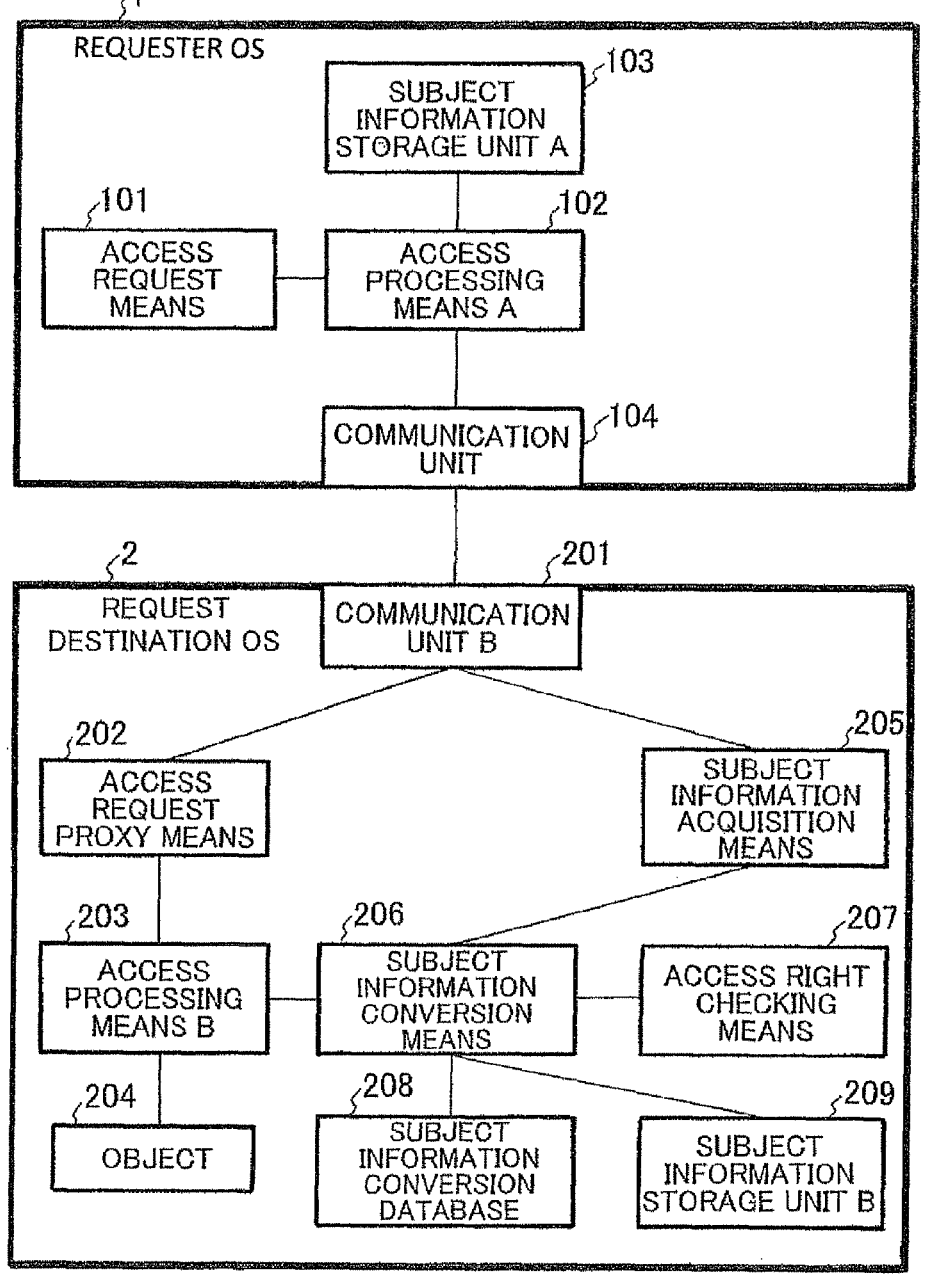
FIG. 1 is a block diagram showing a configuration of a first preferred embodiment of the present invention.

1 Requester OS
101 Access request means
102 Access processing means A
103 Subject information storage unit A
104 Communication unit A
105 Subject information notification means
2 Requester OS
201 Communication unit B
202 Access request proxy means
203 Access processing means B
204 Object
205 Subject information acquisition means
206 Subject information conversion means
207 Subject information conversion database
208 Subject information storage unit B
209 Access right checking means
210 Subject information storage unit C

BEST MODES FOR CARRYING OUT THE INVENTION

Preferred embodiments of the present invention will be described hereinafter with reference to the accompanying drawings.

Referring to FIG. 1, a first preferred embodiment of the present invention is constituted by a requester OS and a request destination OS.

The two OS may be either installed in one information processing apparatus or in different information processing apparatuses, respectively.

A requester OS 1 is configured to include an access request means 101, an access processing means A 102, a subject information storage unit A 103, and a communication unit A 104.

The access request means 101 is a subject that is executed in the requester OS 1, and is an access main body that issues an access request to access an object 204 of a request destination OS 2.

A process or the like operating on the requester OS 1 corresponds to the access request means 101.

The access processing means A 102, which corresponds to a kernel of the requester OS 1, is a unit exercising basic controls of the requester OS 1 such as subject management, memory management, interrupt management, and inter-subject management.

If the access request means 101 issues an access request, the access processing means A 102 transmits the access request to the communication unit A 104.

Subject information on the access request means 101 is stored in the subject information storage unit A 103.

The communication unit A 104 is a communication interface between the requester OS 1 and the request destination OS 2.

The request destination OS 2 is configured to include a communication unit B 201, an access request proxy means 202, an access processing means B 203, the object 204, a subject information acquisition means 205, a subject information conversion means 206, an access right checking means 207, a subject information conversion database 208, and a subject information storage unit B 209.

The communication unit B 201 is a communication interface between the requester OS 1 and the request destination OS 2.

The access request proxy means 202 receives the access request from the requester OS 1 and executes the access request.

As a result, the access request issued by the access request means 101 in the requester OS 1 is dealt with as the access request issued by the access request proxy means 202 in the request destination OS 2.

A UML process, an NFS daemon or the like operating on the request destination OS 2 corresponds to the access request proxy means 202.

The access processing means B 203, which corresponds to a kernel of the request destination OS 2, is a unit exercising system basic controls such as subject management, memory management, interrupt management, and inter-subject management.

If the access request proxy means 201 issues an access request, the access processing means B 203 performs an access processing based on subject information on the access request proxy means 202 and object information on the access target object 204 included in the access request.

The object 204 is an access target to be accessed by the subject.

The object 204 may be an arbitrary computer resource on the request destination OS 2 such as a file, a directory, a semaphore, a pipe, FIFO, a message, a shared memory or a socket.

The subject information acquisition means 205 is means for acquiring the subject information on the access request means 101.

The subject information acquisition means 205 acquires the subject information stored in the subject information storage unit A 103 via the communication unit B 201, the communication unit A 104, and the access processing means A 102.

The subject information conversion means 206 converts subject information to be transmitted to the access right checking means 207 into appropriate subject information.

Even if the access request means 101 in the requester OS 1 issues an access request to access the object 204 on the request destination OS 2, the access processing means B 203 on the request destination OS 2 regards the access request as the access request to access the object 204 from the access request proxy means 202.

Due to this, the object information conversion means 206 acquires the subject information on the access request means 101 via the subject information acquisition means 205 when receiving the access request.

The object information conversion means 206 performs processings for converting the subject information on the access request proxy means 202 based on the acquired subject information and on the subject information conversion database 208, and for transmitting resultant subject information to the access right checking means 207.

The access right checking means 207 checks whether to approve an access to the request destination object based on the subject information on the requester subject and the object information on the request destination object for the access request to be executed, as disclosed in the Patent Document 1 and the Non-Patent Document 1.

Whenever an access request arrives at the access processing means B 203, the access right checking means 207 is invoked. Therefore, whenever each of all subjects executed in the request destination OS 1 issues an access request, it is checked whether to approve the access.

Subject information on the requester OS 1 and subject information allocated on the request destination OS for the subject are stored in the subject information conversion database 208 for every access request means 101 on the requester OS 1.

Subject information on the access request proxy means 202 is stored in the subject information storage unit B 209.

When the subject information conversion means 206 converts the subject information on the access request proxy means 202, the subject information before conversion is saved in this storage unit.

When the subject conversion means 206 returns the access request to the access processing means B 203, the subject information on the access request is returned to the subject information saved in this storage unit.

If the requester OS 1 and the request destination OS 2 are caused to run on the same information processing apparatus in such an environment as the UML environment, the communication units A 104 and B 210 are not present. Due to this, the access processing means A 102 directly notifies the access request proxy means 101 on the request destination OS 2 of the access request without via the communication units. Further, the subject information acquisition means 205 acquires the subject information stored in the subject information storage unit A 103 only via the access processing means A 102 without via the communication units.

Figure 2:
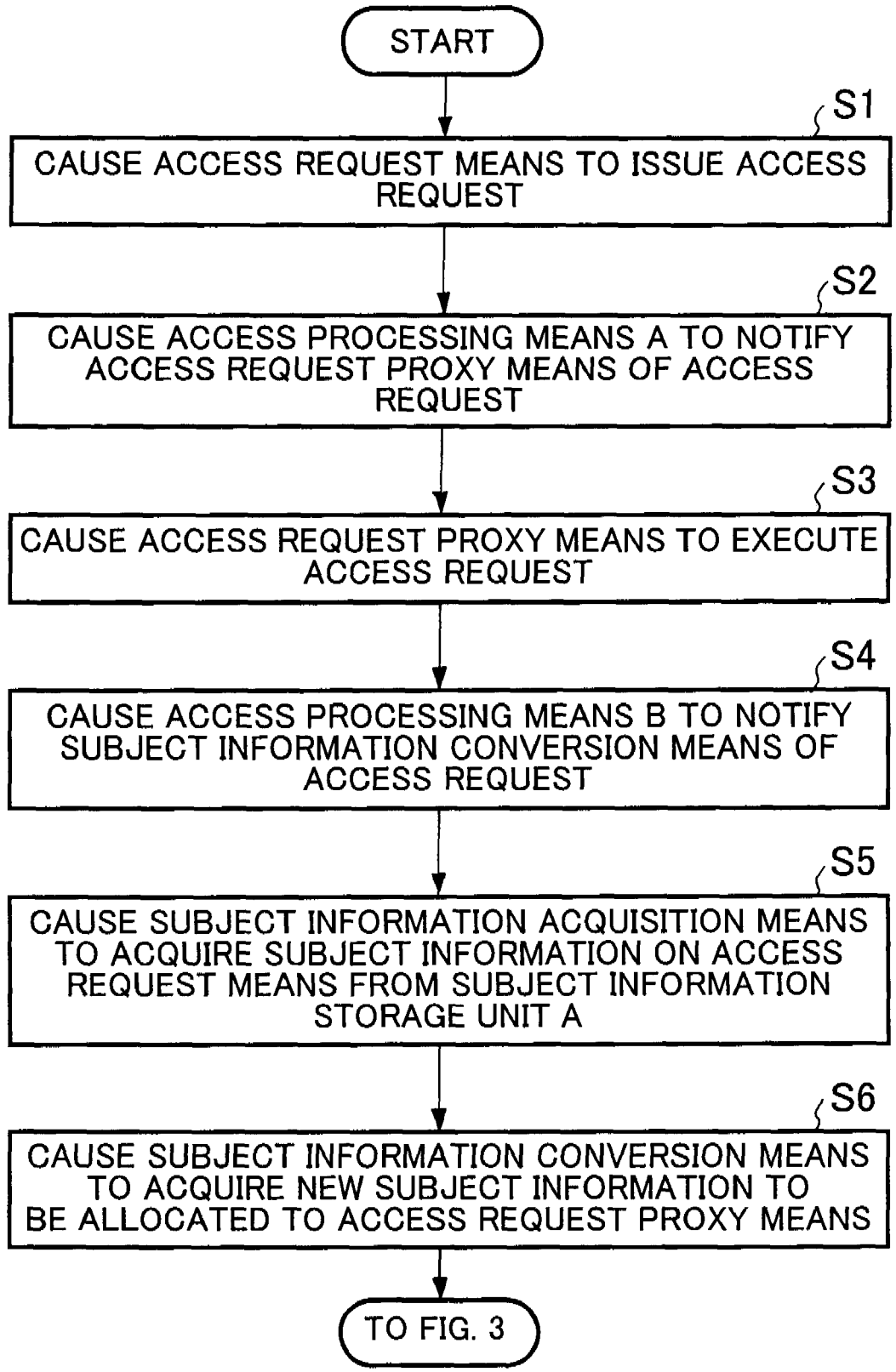
FIG. 2 is a chart showing a first half of a specific example of operation performed in the first preferred embodiment of the present invention.
Figure 3:
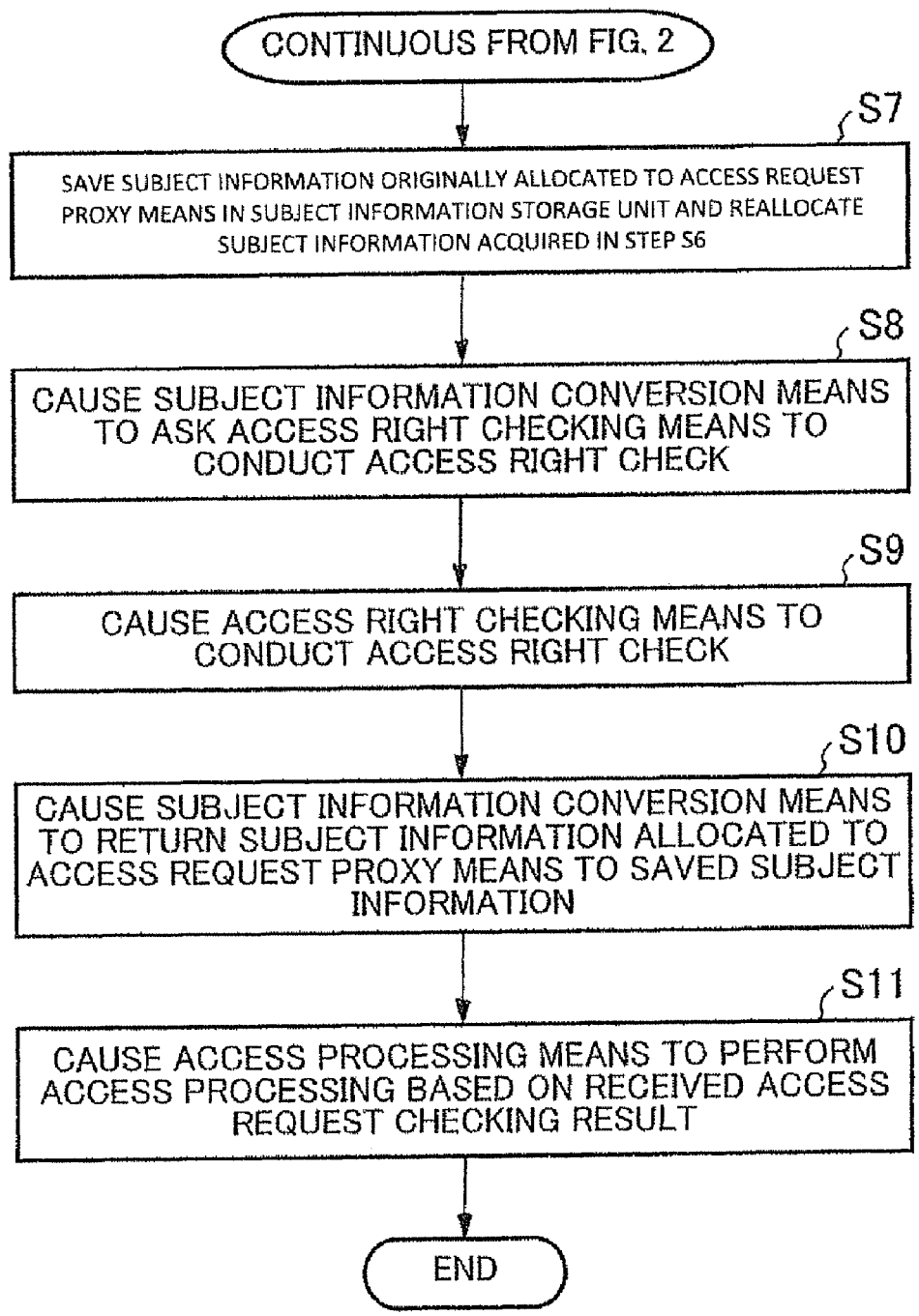
FIG. 3 is a chart showing a second half of the specific example of the operation performed in the first preferred embodiment of the present invention.

Referring to FIG. 1 and flowcharts of FIGS. 2 and 3, overall operation performed in the embodiment will next be described in detail.

The access request means 101 issues an access request to access the object 204 (step S1), and the access processing means A 102 notifies the access request proxy means 202 of the access request via the communication units A 104 and B 201 (step S2).

The access request proxy means 202 executes the received access request (step S3).

The access processing means B 203 notifies the subject information conversion means 206 of the received access request (step S4).

The subject information acquisition means 205 acquires the subject information on the access request means 101 from the subject information storage unit A 103 via the communication unit B 201, the communication unit A 104, and the access processing means 102, and notifies the subject information conversion means 206 of the acquired subject information (step S5).

The subject information conversion means 206 acquires new subject information to be allocated to the access request proxy means 202 based on the subject information acquired at the previous step and on the subject information conversion database 208 (step S6).

The subject information conversion means 206 saves the subject information originally allocated to the access request proxy means 202 in the subject information storage unit B 209, and reallocates the subject information acquired at the previous step to the access request proxy means 202 (step S7).

The subject information conversion means 206 asks the access right checking means 207 to conduct an access right check (step S8).

The access right checking means 207 checks whether to approve the access based on the subject information and the object information on the access request, and notifies the subject information conversion means 206 of a checking result (step S9).

The subject information conversion means 206 returns the subject information allocated to the access request proxy means 202 to the subject information saved in the subject information storage unit B 209, and transmits the checking result at the previous step to the access processing means 203 (step S10).

Finally, the access processing means B 203 performs an access processing for accessing the object if the checking result indicates approval and does not perform the access processing for accessing the object if the checking result indicates disapproval based on the access request checking result received from the previous step (step S11).

Effects of the first preferred embodiment will be described.

A first effect of the embodiment is as follows. According to the embodiment, the subject information acquisition means 205 acquires the subject information on the access request means 101 from the subject information storage unit A 203 via the communication unit B 201, the communication unit A 104, and the access processing means A 102. The subject information conversion means 206 converts the subject information allocated to the access request proxy means 202 according to the acquired subject information. It is, therefore, possible to conduct an access right check according to the type of the access request means 101.

If the access request proxy means 202 issues an access request, the access processing means B 203 performs an access processing based on subject information on the access request proxy means 202 and object information on the access target object 204 included in the access request.

It is, therefore, possible to lessen burden on a system administrator in relation to construction of an access right checking system.

A third effect of the embodiment is as follows. According to the embodiment, an access right checking system corresponding to an access request from the access request means 101 on the requester OS 1 can be easily constructed without changing or modifying the existing access right checking means 207.

A fourth effect of the embodiment is as follows. Even if security vulnerability of the requester OS is exploited to abuse the right of a rightful person of the requester OS and an illegal access is made to the object, it is possible to minimize damage because the access right check according to the invention is grounded on the subject information regardless of the user.

A second preferred embodiment of the present invention will be described in detail with reference to the drawings.

Figure 4:
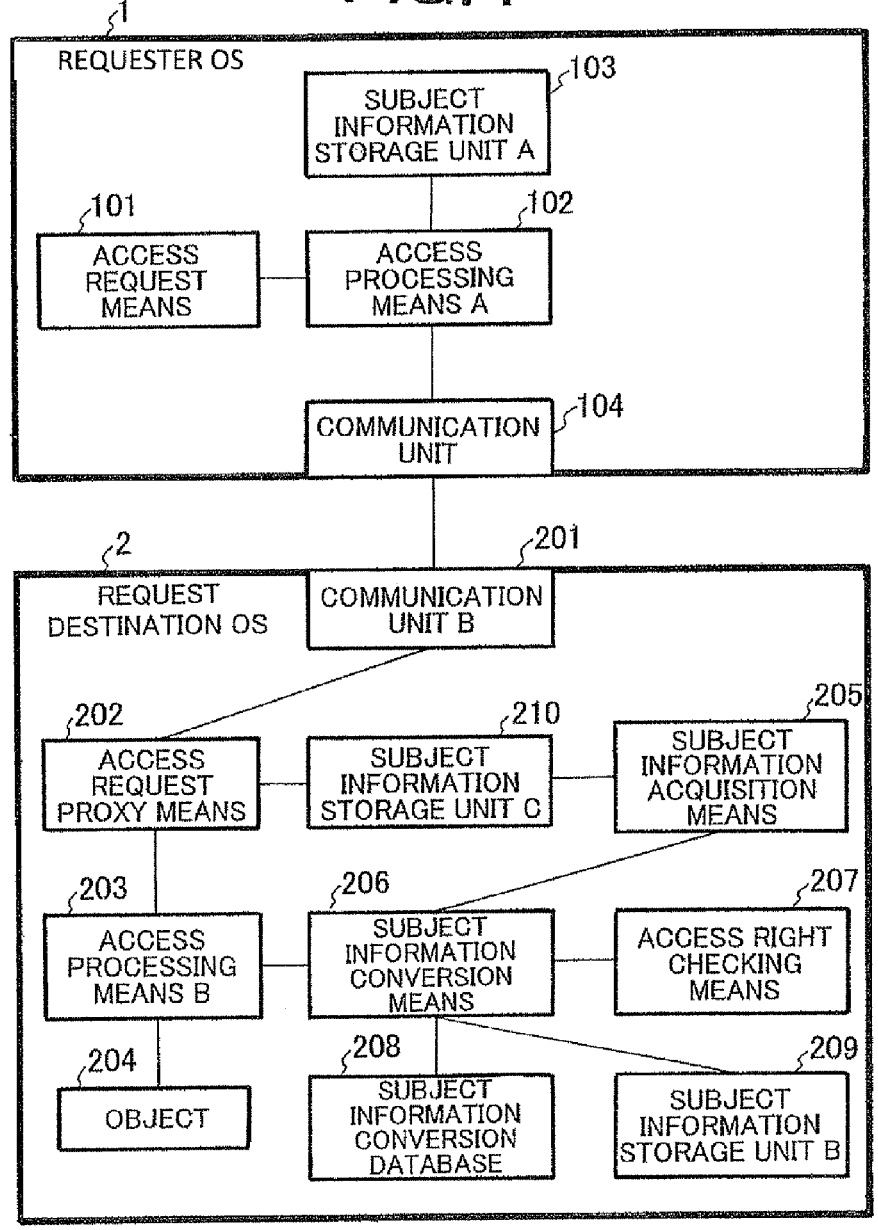
FIG. 4 is a block diagram showing a configuration of a second preferred embodiment of the present invention.

Referring to FIG. 4, the second preferred embodiment of the present invention differs from the first preferred embodiment in that the request destination OS 2 includes a subject information storage unit C 210.

The subject information storage unit C 210 is a storage region in which the access request proxy means A 202 stores subject information on the access request means 101.

According to the addition, the access processing means A 102, the access request proxy means 202, and the subject information acquisition means 205 operate differently from those according to the first preferred embodiment as follows.

When the access request means 101 issues an access request, the access processing means A 102 transmits the access request including the subject information stored in the subject information storage unit A 103 to the communication unit A 104.

The access request proxy means 202 receives the access request from the requester OS 1, stores the subject information on the access request means 101 included in the access request in the subject information storage unit C 210, and executes the received access request.

The subject information acquisition means 205 acquires the subject information on the access request means 101 stored in the subject information storage unit C 210.

If the requester OS 1 and the request destination OS 2 are caused to run on the same information processing apparatus in such an environment as the UML environment, the communication units A 104 and B 210 are not present. Due to this, the access processing means A 102 directly notifies the access request proxy means 101 on the request destination OS 2 of the access request without via the communication units.

Since the remaining constituent elements operate similarly to those according to the first preferred embodiment of the present invention, their operations will not be described herein.

Figure 5:
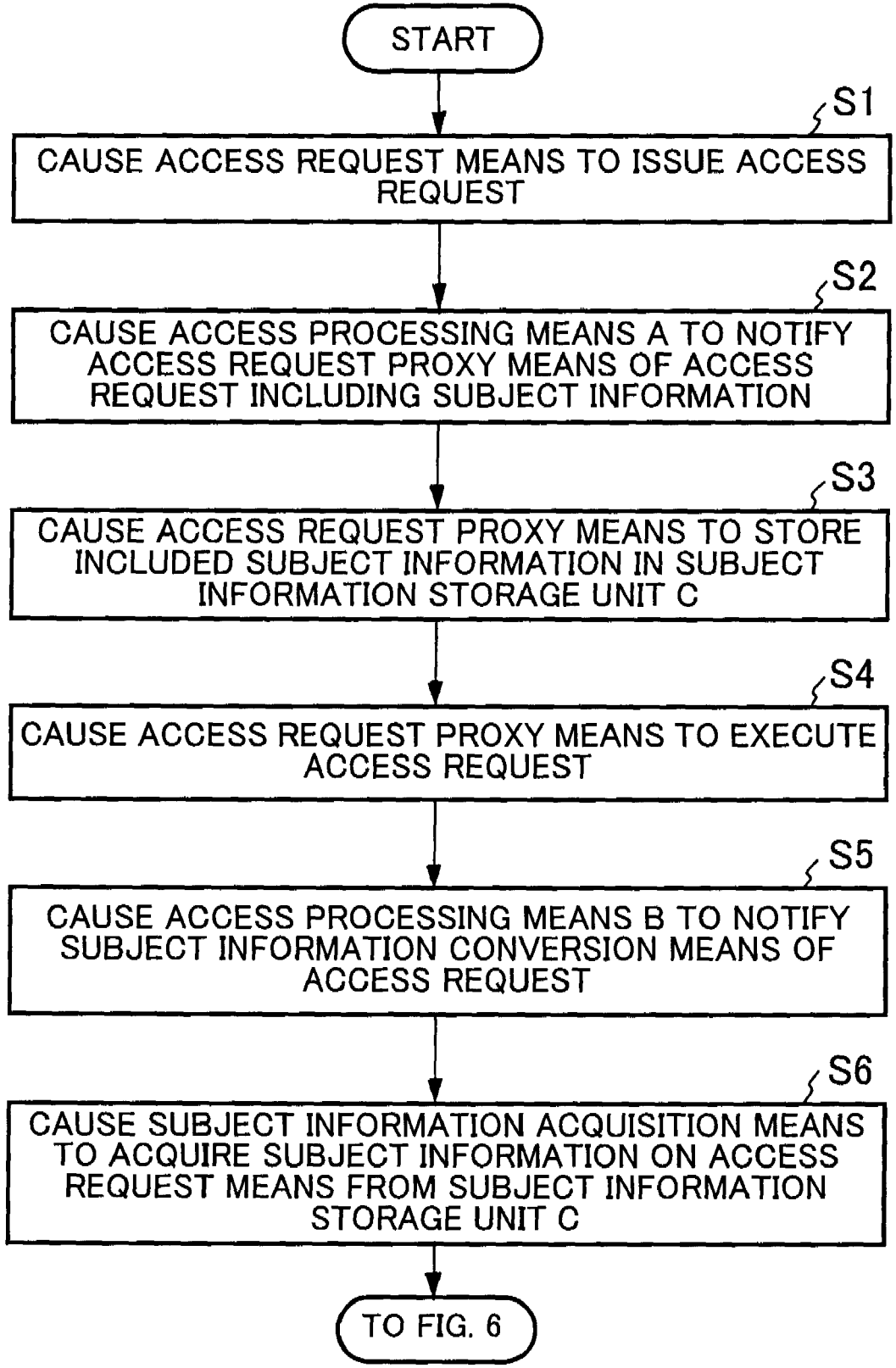
FIG. 5 is a chart showing a first half of a specific example of operation performed in the second preferred embodiment of the present invention.
Figure 6:
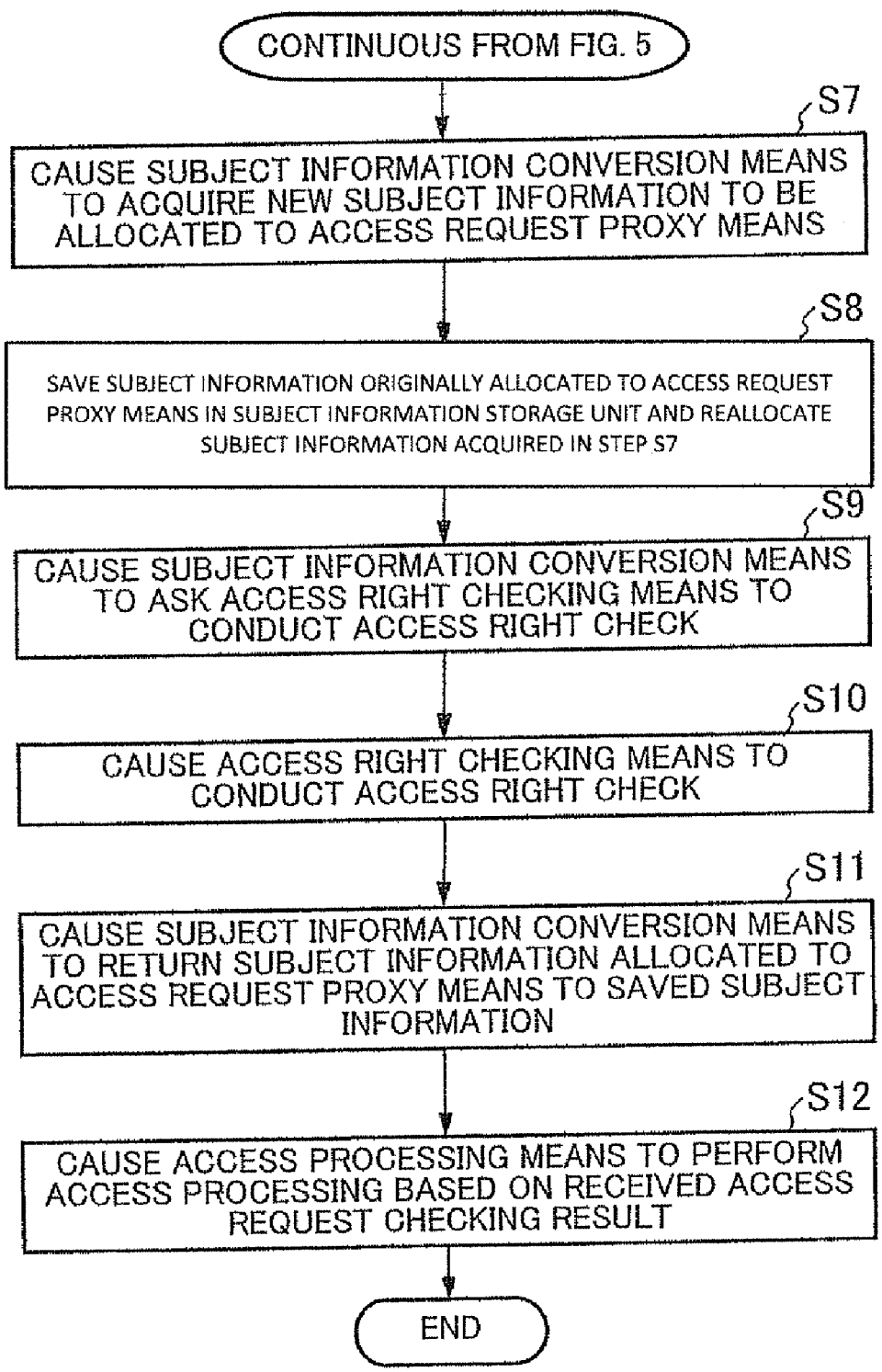
FIG. 6 is a chart showing a second half of the specific example of the operation performed in the second preferred embodiment of the present invention.

Referring to FIG. 4 and flowcharts of FIGS. 5 and 6, overall operation performed in the embodiment will next be described in detail.

The access request means 101 issues an access request to access the object 204 (step S1), and the access processing means A 102 notifies the access request proxy means 202 of the access request including the subject information stored in the subject information storage unit A 103 via the communication units A 104 and B 201 (step S2).

If the requester OS 1 and the request destination OS 2 are caused to run on the same information processing apparatus in such an environment as the UML environment, the communication units A 104 and B 210 are not present. Due to this, the access processing means A 102 directly notifies the access request proxy means 202 on the request destination OS 2 of the access request without via the communication units. Further, the subject information acquisition means 205 acquires the subject information stored in the subject information storage unit A 103 only via the access processing means A 102 without via the communication units.

The access processing means B 202 notifies the subject information conversion means 206 of the received access request (step S5).

The subject information acquisition means 205 acquires the subject information on the access request means 101 from the subject information storage unit C 210, and notifies the subject information conversion means 206 of the acquired subject information (step S6).

The subject information conversion means 206 acquires new subject information to be allocated to the access request proxy means 202 based on the subject information acquired at the previous step and on the subject information conversion database 208 (step S7).

The access processing means B 203 notifies the subject information conversion means 206 of the received access request (step S4).

The subject information conversion means 206 asks the access right checking means 207 to conduct an access right check (step S9).

The access right checking means 207 checks whether to approve the access based on the subject information and the object information on the access request, and notifies the object information conversion means 206 of a checking result (step S10).

The subject information conversion means 206 returns the subject information allocated to the access request proxy means 202 to the subject information saved in the subject information storage unit B 209, and transmits the checking result at the previous step to the access processing means 203 (step S11).

Finally, the access processing means B 203 performs an access processing for accessing the object if the checking result indicates approval and does not perform the access processing for accessing the object if the checking result indicates disapproval based on the access request checking result received from the previous step (step S12).

Effects of the second preferred embodiment will be described.

A first effect of the embodiment is as follows. According to the embodiment, the access request proxy means 202 stores the subject information on the access request means 101 in the subject information storage unit C 210. The subject information acquisition means 205 acquires the subject information on the access request means 101 from the subject information storage unit C 210. The subject information conversion means 206 converts the subject information allocated to the access request proxy means 202 according to the acquired subject information. It is, therefore, possible to conduct an access right check according to the type of the access request means 101.

A second effect of the embodiment is as follows. According to the embodiment, the access right checking means 207 on the request destination OS conducts all access right checks. Due to this, the request destination OS can integrally manage all access right checking policies with respect to the access request means 101.

It is, therefore, possible to lessen burden on a system administrator in relation to construction of an access right checking system.

A third effect of the embodiment is as follows. According to the embodiment, an access right checking system corresponding to an access request from the access request means 101 on the requester OS 1 can be easily constructed without changing or modifying the existing access right checking means 207.

A fourth effect of the embodiment is as follows. Even if security vulnerability of the requester OS is exploited to abuse the right of a rightful person of the requester OS and an illegal access is made to the object, it is possible to minimize damage because the access right check according to the invention is grounded on the subject information regardless of the user.

A third preferred embodiment of the present invention will be described in detail with reference to the drawings.

Figure 7:
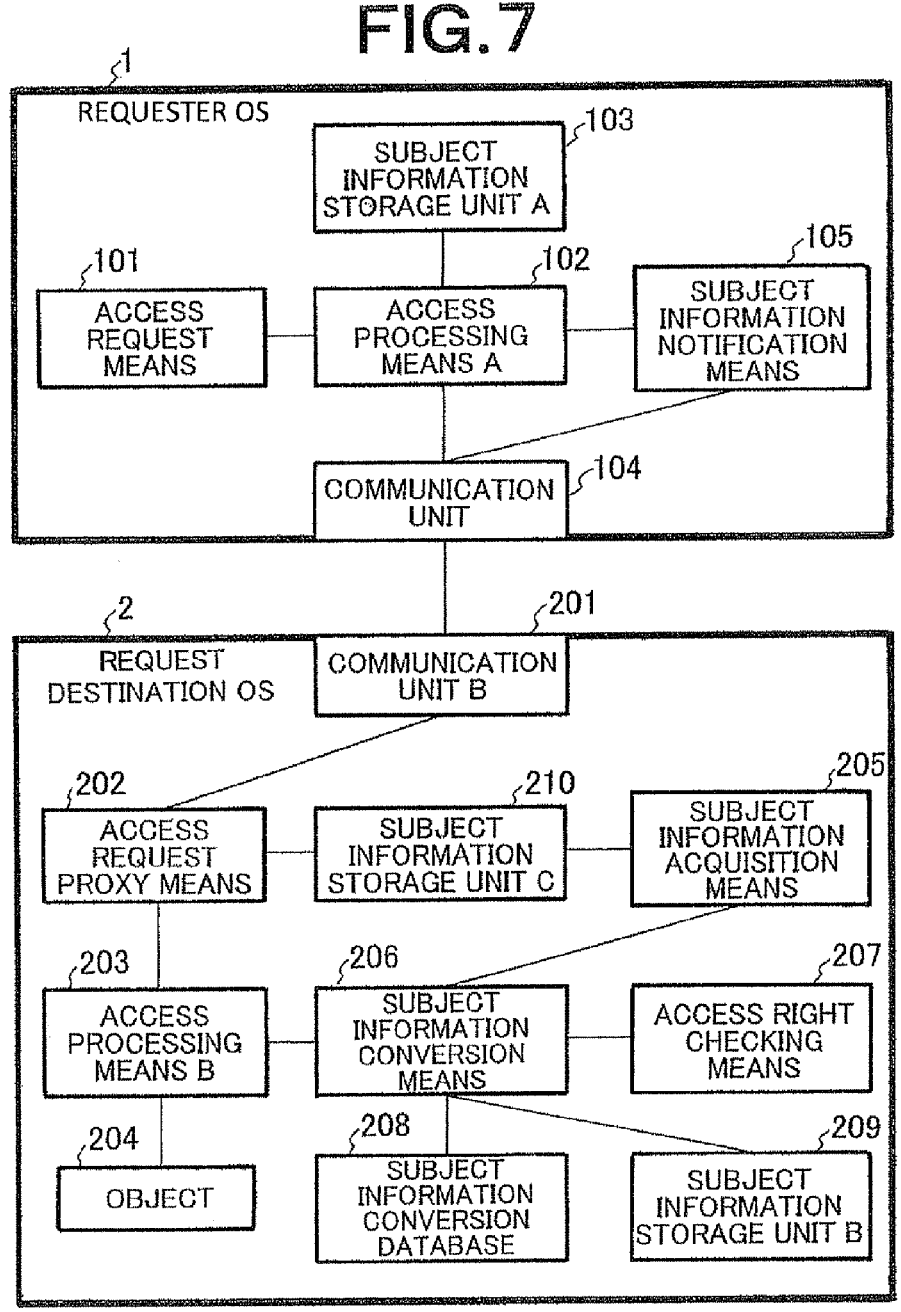
FIG. 7 is a block diagram showing a configuration of a third preferred embodiment of the present invention.
Figure 8:
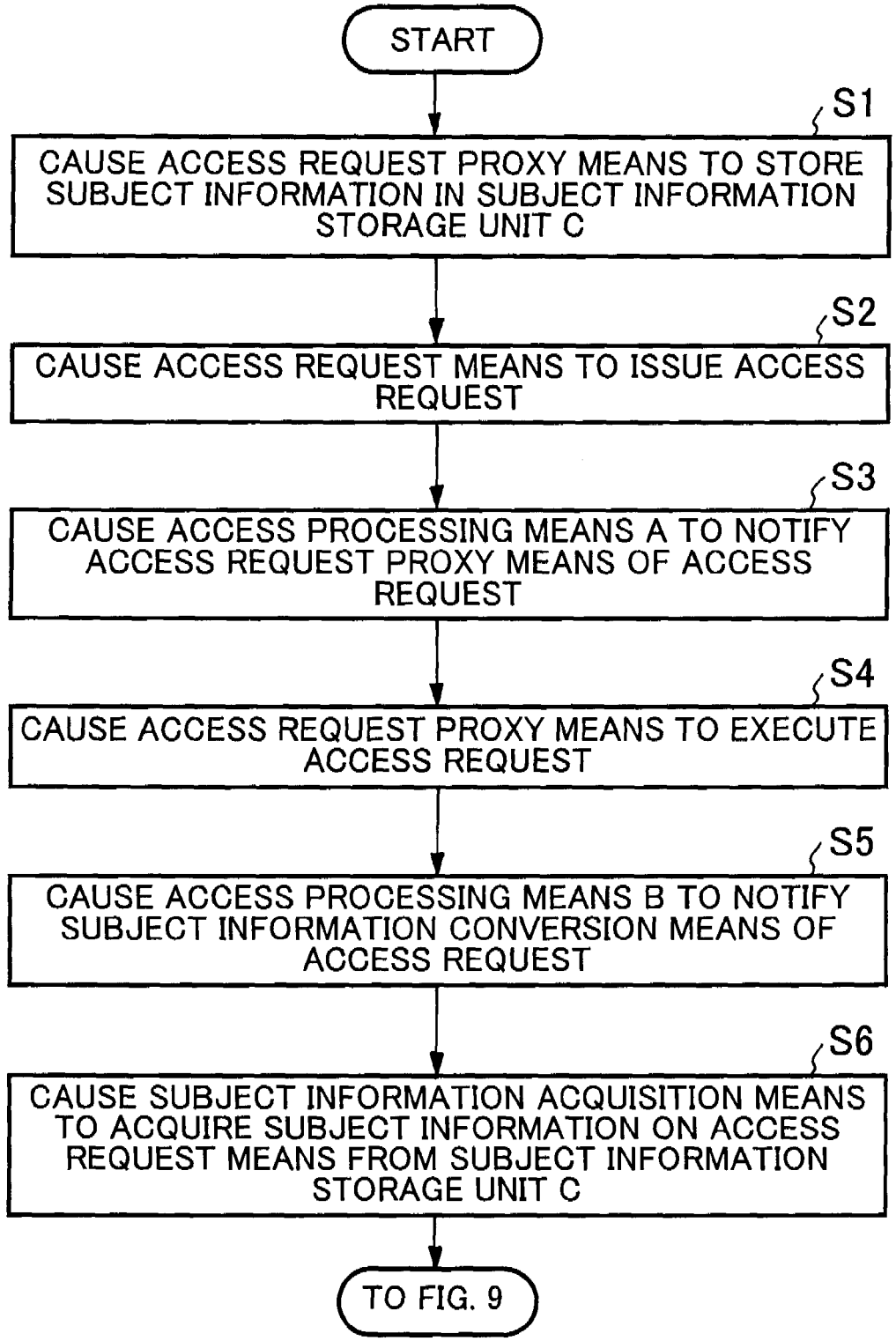
FIG. 8 is a chart showing a first half of a specific example of operation performed in the third preferred embodiment of the present invention.
Figure 9:
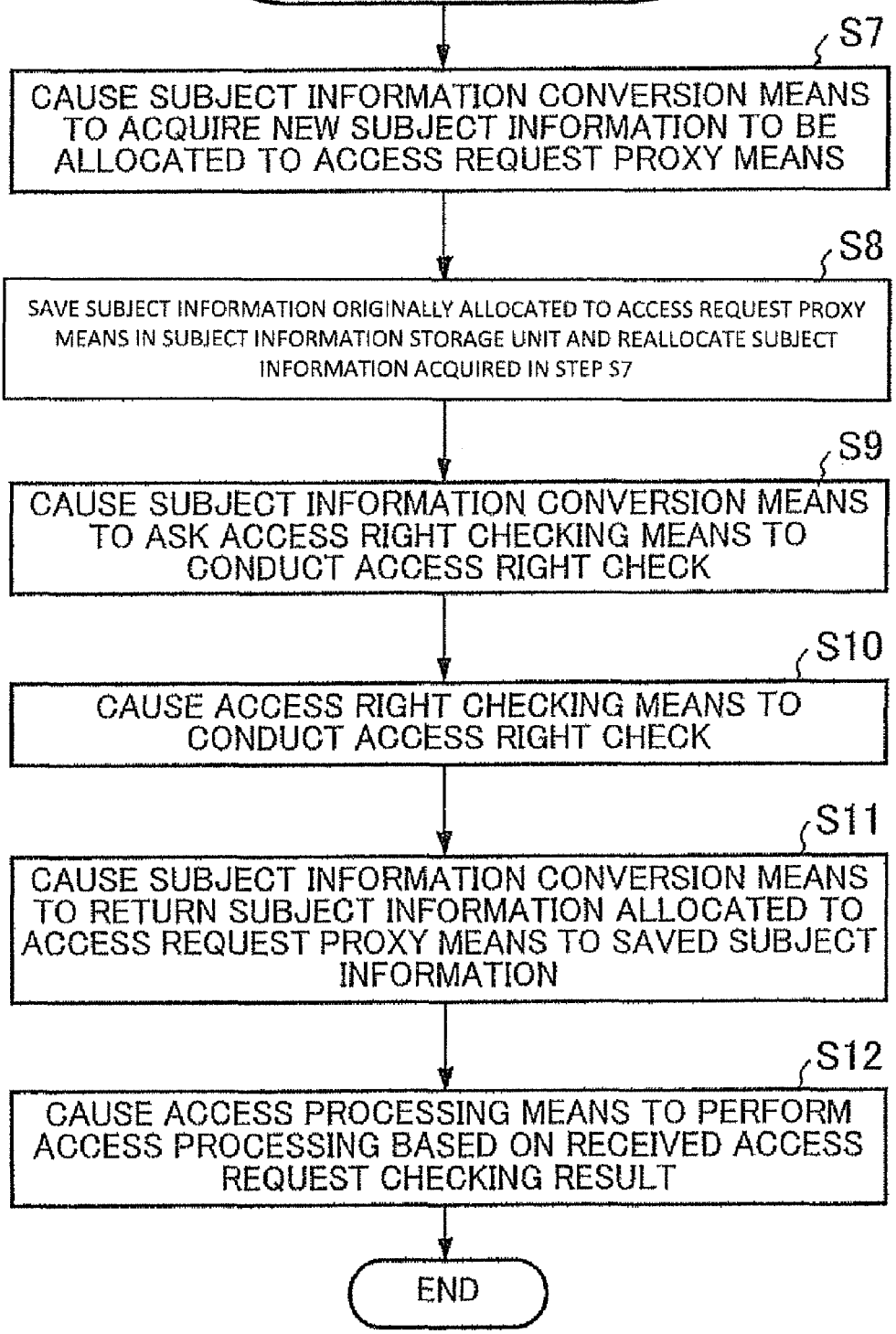
FIG. 9 is a chart showing a second half of the specific example of the operation performed in the third preferred embodiment of the present invention.

Referring to FIG. 7, the second preferred embodiment of the present invention differs from the first preferred embodiment in that the requester OS 1 includes a subject information notification means 105 and the request destination OS 2 includes a subject information storage unit C 210.

When context switching occurs on the access processing means A 102, the subject information notification means 105 transmits subject information on a subject to be executed after switching to the access request proxy means 101 via the communication units A 104 and B 210.

The context switching means an operation for switching a subject to be executed on a multitask OS.

The subject information storage unit C 210 is a storage region in which the subject information notification means 105 stores subject information.

According to the addition, the access request proxy means 101 and the subject information acquisition means 205 operate differently from those according to the first preferred embodiment as follows.

Besides the operation described in the first preferred embodiment of the present invention, the access request proxy means 101 stores subject information in the subject information storage unit C 210 when receiving notification of the subject information from the subject information notification means 105 on the requester OS 1.

The subject information acquisition means 205 acquires the subject information on the access request means 101 stored in the subject information storage unit C 210.

If the requester OS 1 and the request destination OS 2 are caused to run on the same information processing apparatus in such an environment as the UML environment, the communication units A 104 and B 210 are not present. Due to this, notifications from the access request means 101 and the subject information notification means 105 are directly transmitted to the access request proxy means 101 on the request destination OS 2 without via the communication units.

Since the remaining constituent elements operate similarly to those according to the first preferred embodiment of the present invention, their operations will not be described herein.

If the requester OS 1 and the request destination OS 2 are caused to run on the same information processing apparatus in such an environment as the UML environment, the communication units A 104 and B 210 are not present. Due to this, the access processing means A 102 directly notifies the access request proxy means 202 on the request destination OS 2 of the access request without via the communication units.

Whenever context switching occurs on the access processing means A 102 on the requester OS 1, the subject information notification means 105 notifies the access request proxy means 101 of subject information on a subject being executed and the access request proxy means 101 stores the subject information in the subject information storage unit C 210 (step S1).

The access request means 101 issues an access request to access the object 204 (step S2), and the access processing means A 102 notifies the access request proxy means 202 of the access request via the communication units A 104 and B 201 (step S3).

The access request proxy means 202 executes the received access request (step S4).

The access processing means B 203 notifies the subject information conversion means 206 of the received access request (step S5).

The access processing means B 203 notifies the subject information conversion means 206 of the received access request (step S5).

The subject information conversion means 206 acquires new subject information to be allocated to the access request proxy means 202 based on the subject information acquired at the previous step and on the subject information conversion database 208 (step S7).

The subject information conversion means 206 saves the subject information originally allocated to the access request proxy means 202 in the subject information storage unit B 209, and reallocates the subject information acquired at the previous step to the access request proxy means 202 (step S8).

The subject information conversion means 206 asks the access right checking means 207 to conduct an access right check (step S9).

The access right checking means 207 checks whether to approve the access based on the subject information and the object information on the access request, and notifies the object information conversion means 206 of a checking result (step S10).

The subject information conversion means 206 returns the subject information allocated to the access request proxy means 202 to the subject information saved in the subject information storage unit B 209, and transmits the checking result at the previous step to the access processing means 203 (step S11).

Finally, the access processing means B 203 performs an access processing for accessing the object if the checking result indicates approval and does not perform the access processing for accessing the object if the checking result indicates disapproval based on the access request checking result received from the previous step (step S12).

Effects of the third preferred embodiment will be described.

A first effect of the embodiment is as follows. According to the embodiment, the access request proxy means 202 stores the subject information on the access request means 101 in the subject information storage unit C 210. The subject information acquisition means 205 acquires the subject information on the access request means 101 from the subject information storage unit C 210. The subject information conversion means 206 converts the subject information allocated to the access request proxy means 202 according to the acquired subject information. It is, therefore, possible to conduct an access right check according to the type of the access request means 101.

A second effect of the embodiment is as follows. According to the embodiment, the access right checking means 207 on the request destination OS conducts all access right checks. Due to this, the request destination OS can integrally manage all access right checking policies with respect to the access request means 101.

It is, therefore, possible to lessen burden on a system administrator in relation to construction of an access right checking system.

A third effect of the embodiment is as follows. According to the embodiment, an access right checking system corresponding to an access request from the access request means 101 on the requester OS 1 can be easily constructed without changing or modifying the existing access right checking means 207.

A fourth effect of the embodiment is as follows. Even if security vulnerability of the requester OS is exploited to abuse the right of a rightful person of the requester OS and an illegal access is made to the object, it is possible to minimize damage because the access right check according to the invention is grounded on the subject information regardless of the user.

EXAMPLES

A first example of the present invention will be described with reference to FIGS. 1 to 3.

The first example corresponds to the first preferred embodiment of the present invention.

An environment of the first example is a virtual machine environment of one information processing apparatus, and it is assumed that a personal computer is the information processing apparatus, the UML is the requester OS 1, and the Linux is the request destination OS 2.

When context switching occurs on the access processing means A 102, the subject information notification means 105 transmits subject information on a subject to be executed after switching to the access request proxy means 202 via the communication units A 104 and B 210.

The subject information storage unit A 103 can be regarded as a subject information storage region A secured on a main memory. It is assumed that absolute paths (e.g., /user/local/bin/app3) for files to be executed by the application process are stored in the subject information storage unit A 103.

In the first example, the Linux is used as the request destination OS 2. Due to this, among the constituent elements of the request destination OS 2 shown in FIG. 1, the access request proxy means 202 can be regarded as an execution process in the UML kernel, the access processing means B 203 as a host Linux kernel, and the object 204 as a file A on the host Linux. Furthermore, the subject information acquisition means 205 can be regarded as an object information acquisition module operating in the kernel, the subject information conversion means 206 as a subject information conversion module operating in the kernel, and the access right checking means 207 as SELinux.

According to the addition, the access request proxy means 202 and the subject information acquisition means 205 operate differently from those according to the first preferred embodiment as follows.

Besides the operation described in the first preferred embodiment of the present invention, the access request proxy means 202 stores subject information in the subject information storage unit C 210 when receiving notification of the subject information from the subject information notification means 105 on the requester OS 1.

The subject information conversion database 208 can be regarded as a subject information conversion database storage region on the main memory. It is assumed that path information on files executed by processes on the UML and SIDs allocated to the respective processes are stored in the subject information conversion database 208 for every process.

If the requester OS 1 and the request destination OS 2 are caused to run on the same information processing apparatus in such an environment as the UML environment, the communication units A 104 and B 210 are not present. Due to this, notifications from the access request means 101 and the subject information notification means 105 are directly transmitted to the access request proxy means 202 on the request destination OS 2 without via the communication units.

In summary, in the first example, when the SELinux causes the UML to run on the Linux into which the SELinux is installed, an access right check of an access from a process on the UML to a resource on the host Linux is conducted using the SELinux installed into the host Linux.

Operation performed when an application process on the UML issues a read request to read a file on the host Linux via Host Filesystem will be described using the above-stated configuration.

Whenever context switching occurs on the access processing means A 102 on the requester OS 1, the subject information notification means 105 notifies the access request proxy means 202 of subject information on a subject being executed and the access request proxy means 202 stores the subject information in the subject information storage unit C 210 (step S1).

The execution process in the UML kernel that has received the system call reissues a system call for reading the file A to the host Linux kernel.

As a result, the host Linux kernel interprets the issued system call as a system call for allowing the execution process in the UML kernel to read the file.

Next, the host Linux performs a reading processing. Before the reading processing, the subject information acquisition module transmits an inquiry to the UML kernel on the UML and acquires the absolute path to the file executed by the application process.

The subject information conversion module acquires an SID to be allocated to the execution process in the UML kernel based on the absolute path and on information stored in the subject information conversion database storage region.

If the subject information conversion database storage region shown in FIG. 10 is used, the absolute path to the file executed by the application process is /usr/local/bin/app3. Therefore, the subject information conversion module acquires 13 as the SID.

The subject information conversion module saves the SID originally allocated to the execution process in the UML kernel in the subject information storage region B, adds the acquired SID to the execution process in the UML kernel, and asks the SELinux to conduct an access right check. The SELinux conducts an access right check based on the SID 13 allocated to the execution process in the UML kernel and on the SID allocated to the file A.

By doing so, the system call from the execution process in the UML kernel is replaced by an appropriate SID according to the application process on the UML based on which the system call is issued, and the access right check is conducted.

If the SELinux conducts the access right check, a result indicating access approval or access disapproval is transmitted to the subject information conversion module. Next, the subject information conversion module returns the original SID of the execution process in the UML kernel stored in the subject information storage region B to the execution process in the UML kernel.

When these processings are finished, the subject information conversion module returns processing to the host Linux kernel.

The host Linux kernel performs an actual access processing based on the result of the access right check conducted by the SELinux.

If the check result indicates access approval, an access processing for causing the UML kernel to access the file A is executed.

If the check result indicates access disapproval, the access processing is not executed.

A second example of the present invention will be described with reference to FIGS. 4 to 6.

The second example corresponds to the second preferred embodiment of the present invention.

The second example differs in configuration from the first example in that the subject information storage unit C 210 is provided on the host Linux. However, the remaining constituent elements are the same as those in the first example.

The subject information storage unit C 210 can be regarded as a subject information storage region C secured on a main memory, and absolute paths of an application process are stored in the subject information storage region C.

Operation performed when an application process on the UML issues a read request to read a file on the host Linux via Host Filesystem will be described using the above-stated configuration.

When the application process on the UML issues a system call for reading the file A, the UML kernel notifies an execution process in the UML kernel on the host Linux of the system call including an absolute path to the file to be executed by the application process.

The execution process in the UML kernel that has received the system call stores the absolute path of the application process transmitted to the execution process in the subject information storage region C.

The execution process in the UML kernel reissues a system call for reading the file A to the host Linux kernel.

As a result, the host Linux kernel interprets the issued system call as a system call for allowing the execution process in the UML kernel to read the file.

Next, the host Linux performs a reading processing. Before the reading processing, the subject information acquisition module transmits an inquiry to the UML kernel on the UML and acquires the absolute path to the file executed by the application process.

The subject information conversion module acquires an SID to be allocated to the execution process in the UML kernel based on the absolute path and on information stored in the subject information conversion database storage region.

If the subject information conversion database storage region shown in FIG. 10 is used, the absolute path to the file executed by the application process is /usr/local/bin/app3. Therefore, the subject information conversion module acquires 13 as the SID.

The subject information conversion module saves the SID originally allocated to the execution process in the UML kernel in the subject information storage region B, adds the acquired SID to the execution process in the UML kernel, and asks the SELinux to conduct an access right check. The SELinux conducts an access right check based on the SID 13 allocated to the execution process in the UML kernel and on the SID allocated to the file A.

By doing so, the system call from the execution process in the UML kernel is replaced by an appropriate SID according to the application process on the UML based on which the system call is issued, and the access right check is conducted.

If the SELinux conducts the access right check, a result indicating access approval or access disapproval is transmitted to the subject information conversion module. Next, the subject information conversion module returns the original SID of the execution process in the UML kernel stored in the subject information storage region B to the execution process in the UML kernel.

When these processings are finished, the subject information conversion module returns processing to the host Linux kernel.

The host Linux kernel performs an actual access processing based on the result of the access right check conducted by the SELinux.

If the check result indicates access approval, an access processing for causing the UML kernel to access the file A is executed.

If the check result indicates access disapproval, the access processing is not executed.

A third example of the present invention will be described with reference to FIGS. 7 to 10.

The third example corresponds to the third preferred embodiment of the present invention.

The third example differs in configuration from the first example in that the subject information notification means 105 is provided in the UML and that the subject information storage unit C 210 is provided on the host Linux.

The subject information notification means 105 can be regarded as a subject notification means module that notifies the subject information storage unit C of subject information on a process after switching whenever context switching occurs.

The subject information storage unit C 210 can be regarded as a subject information storage region C secured on a main memory, and absolute paths to processes executed by an application process are stored in the subject information storage region C.

Operation performed when an application process on the UML issues a read request to read a file on the host Linux via Host Filesystem will be described using the above-stated configuration.

It is assumed that context switching occurs in the UML kernel and that an application process is executed.

The subject information notification module then stores an absolute path to a file executed by the application process in the subject information storage region C via the execution process in the UML kernel.

When the application process on the UML issues a system call for reading the file A, the UML kernel notifies an execution process in the UML kernel on the host Linux of the system call.

The execution process in the UML kernel that has received the system call reissues a system call for reading the file A to the host Linux kernel.

As a result, the host Linux kernel interprets the issued system call as a system call for allowing the execution process in the UML kernel to read the file.

Next, the host Linux performs a reading processing. Before the reading processing, the subject information acquisition module transmits an inquiry to the subject information storage region C, and acquires the absolute path to the file executed by the application process.

The subject information conversion module acquires an SID to be allocated to the execution process in the UML kernel based on the absolute path and on information stored in the subject information conversion database storage region.

If the subject information conversion database storage region shown in FIG. 10 is used, the absolute path to the file executed by the application process is /usr/local/bin/app3. Therefore, the subject information conversion module acquires 13 as the SID.

The subject information conversion module saves the SID originally allocated to the execution process in the UML kernel in the subject information storage region B, adds the acquired SID to the execution process in the UML kernel, and asks the SELinux to conduct an access right check. The SELinux conducts an access right check based on the SID 13 allocated to the execution process in the UML kernel and on the SID allocated to the file A.

By doing so, the system call from the execution process in the UML kernel is replaced by an appropriate SID according to the application process on the UML based on which the system call is issued, and the access right check is conducted.

If the SELinux conducts the access right check, a result indicating access approval or access disapproval is transmitted to the subject information conversion module. Next, the subject information conversion module returns the original SID of the execution process in the UML kernel stored in the subject information storage region B to the execution process in the UML kernel.

When these processings are finished, the subject information conversion module returns processing to the host Linux kernel.

The host Linux kernel performs an actual access processing based on the result of the access right check conducted by the SELinux.

If the check result indicates access approval, an access processing for causing the UML kernel to access the file A is executed.

If the check result indicates access disapproval, the access processing is not executed.

It is assumed in the first to third examples described so far that the personal computer is used as the information processing apparatus. However, an arbitrary information processing apparatus such as a workstation, a PDA or a cellular telephone may be used as long as the apparatus includes a CPU, a main memory, and an external memory device.

In the first to third examples, the respective storage units and the subject information conversion database are secured on the main memory. Alternatively, the respective storage units and the subject information conversion database may be secured on the external storage device.

In the first to third examples, the UML is used as the requester OS 1. Alternatively, an OS such as VMware or Xen operating on a virtual machine may be used as the requester OS 1.

In the first to third examples, the Linux is used as the request destination OS 2. Alternatively, an arbitrary OS such as Windows® or UNIX® may be used as the request destination OS 2 as long as the OS can receive an access request from another OS.

In the first to third examples, the SELinux is used as the access right checking program. Alternatively, an arbitrary program such as LID may be used as the access right checking program as long as the program serves as the access right checking means 207 capable of controlling all access requests executed on the OS.

In the first to third examples, the absolute path to the execution file is used as the subject information on the application process. Alternatively, an arbitrary means such as PID may be used as long as the means is an identifier capable of uniquely identifying the application process.

In the first to third examples, the SIDs (Security IDs) to be allocated by the SELinux are stored in the subject information storage region B. However, arbitrary information may be stored therein as long as the information includes an identifier used by the access right checking system as the subject information.

In the first to third examples, the paths to files to be executed by processes on the UML and the SIDs allocated to the respective processes are stored in the subject information conversion database 208. Alternatively, arbitrary information such as PIDs of the processes on the UML and SIDs allocated by the SELinux may be stored in the subject information conversion database 208 as long as the information for identifying the processes on the requester OS 1 and identifiers for access right checks to be allocated to the respective processes are stored therein.

In the first to third examples, it is configured that only one guest OS runs on the host OS. Alternatively, a plurality of guest OS may run on the host OS.

In the first to third examples, the virtual machine environment of one information processing apparatus is assumed. Alternatively, the present invention may be applied to an environment in which the requester OS and the request destination OS are installed in each of two information processing apparatuses, and in which the information processing apparatuses can mutually refer to computer resources in the other information processing apparatuses by a communication program such as NFS or Samba.

In this case, the access request proxy means 202 shown in FIGS. 1, 4, and 7 means a server process of a communication program.

INDUSTRIAL APPLICABILITY

The access right checking system according to the present invention can be used as the access right checking system in the virtual machine environment in which one host OS is executed on one information processing apparatus and in which a plurality of guest OS can be caused to run on the host OS.

Moreover, the access right checking system according to the present invention can be used as the access right checking system in which each of a plurality of information processing apparatuses protects its internal computer resources in an environment in which a plurality of information processing apparatuses is connected to a network such as a LAN (Local Area Network).

The invention claimed is:

1. An access right checking method for conducting an access right check on a request destination OS (Operating System) according to a right of a subject executed on a requester OS when the subject issues an access request to access the object, the access right checking method comprising:
   a first step of, in response to the access request to access the object from the subject, causing proxy means on the request destination OS to issue a secondary access request wherein the subject is an access main body on the requester OS and the object is an access target on the request destination OS;
   a second step of causing the request destination OS to acquire the subject information on the subject from the requester OS when the secondary access request is issued at the first step;
   a third step of causing the request destination OS to convert the acquired subject information on the subject to secondary subject information having same format as original subject information on the proxy means; and
   a fourth step of causing the request destination OS to check whether the subject has a right to access the object based on the secondary subject information and on object information on the object.

2. An access right checking method for conducting an access right check on a request destination OS (Operating System) according to a right of a subject executed on a requester OS when the subject issues an access request to access the object, the access right checking method comprising:
   a first step of causing the requester OS to add subject information on the subject to the access request and for notifying the request destination OS of the access request added with the subject information when the requester OS receives the access request from the subject, wherein the subject is an access main body on the requester OS and the object is an access target on the request destination OS;
   a second step of causing the request destination OS to store the subject information on the subject added to the access request in a subject information storage unit when the request destination OS receives the access request added with the subject information from the requester OS, and of subsequently causing proxy means on the request destination OS to issue a secondary access request;
   a third step of causing the request destination OS to acquire the subject information on the subject from the subject information storage unit when the secondary access request is issued at the second step;
   a fourth step of causing the request destination OS to convert the acquired subject information on the subject to secondary subject information having same format as original subject information on the proxy means; and
   a fifth step of causing the request destination OS to check whether subject has a right to access the object based on the secondary subject information and on object information on the object.

3. An access right checking method for conducting an access right check on a request destination OS (Operating System) according to a right of a subject executed on a requester OS when the subject issues an access request to access the object, the access right checking method comprising:
   a first step of causing the requester OS to store subject information on the subject executed after switching of the subject in a subject information storage unit on the request destination OS whenever an operation for switching the subject executed occurs in the requester OS, wherein the subject is an access main body on the requester OS and the object is an access target on the request destination OS;
   a second step of, in response to the access request to access the object from the subject, causing proxy means on the request destination OS to issue a secondary access request;
   a third step of causing the request destination OS to acquire the subject information on the subject OS from the subject information storage unit when the secondary access request is issued at the second step;
   a fourth step of causing the request destination OS to convert the acquired subject information on the subject to secondary subject information having same format as original subject information on the proxy means; and
   a fifth step of causing the request destination OS to check whether the subject has a right to access the object based on the secondary subject information and on object information on the object.

4. The access right checking method according to claim 1, claim 2, or claim 3,
   wherein the requester OS and the request destination OS are caused to run on one information processing apparatus.

5. The access right checking method according to claim 1, claim 2, or claim 3,
   wherein the requester OS and the request destination OS are caused to run on different information processing apparatuses, respectively.

6. The access right checking method according to claim 1, 2, or 3,
   wherein one process on the request destination OS acts as a proxy of a process on the requester OS, an access control is exercised on the process on the request destination OS using an access control mechanism included in the request destination OS, and the process on the requester OS accesses a file on the request destination OS if approved.

7. A non-transitory computer readable medium on which a program is recorded, said program comprising codes which, when executed, cause a computer to execute an access right checking method for conducting an access right check on a request destination OS (Operating System) according to a right of a subject executed on a requester OS when the subject issues an access request to access the object, the access right checking method comprising:

a first step of, in response to the access request to access the object from the subject, causing proxy means on the request destination OS to issue a secondary access request, wherein the subject is an access main body on the requester OS and the object is an access target on the request destination OS;

a second step of causing the request destination OS to acquire the subject information on the subject from the requester OS when the secondary access request is issued at the first step;

a third step of causing the request destination OS to convert the acquired subject information on the subject to secondary subject information having same format as original subject information on the proxy means; and a fourth step of causing the request destination OS to check whether the subject has a right to access the object based on the secondary subject information and on object information on the object.

8. A non-transitory computer readable medium on which a program is recorded, said program comprising codes which, when executed, cause a computer to execute an access right checking method for conducting an access right check on a request destination OS (Operating System) according to a right of a subject executed on a requester OS when the subject issues an access request to access the object, the access right checking method comprising:

a first step of causing the requester OS to add subject information on the subject to the access request and for notifying the request destination OS of the access request added with the subject information when the requester OS receives the access request from the subject wherein the subject is an access main body on the requester OS and the object is an access target on the request destination OS;

a second step of causing the request destination OS to store the subject information on the subject added to the access request in a subject information storage unit when the request destination OS receives the access request added with the subject information from the requester OS, and of subsequently causing proxy means on the request destination OS to issue a secondary access request;

a third step of causing the request destination OS to acquire the subject information on the subject from the subject information storage unit when the secondary access request is issued at the second step;

a fourth step of causing the request destination OS to convert the acquired subject information on the subject to secondary subject information having same format as original subject information on the proxy means; and a fifth step of causing the request destination OS to check whether subject has a right to access the object based on the secondary subject information and on object information on the object.

9. A non-transitory computer readable medium on which a program is recorded, said program comprising codes which, when executed, cause a computer to execute an access right checking method for conducting an access right check on a request destination OS (Operating System) according to a right of a subject executed on a requester OS when the subject issues an access request to access the object, the access right checking method comprising:

a first step of causing the requester OS to store subject information on the subject executed after switching of the subject in a subject information storage unit on the request destination OS whenever an operation for switching the subject executed occurs in the requester OS, wherein the subject is an access main body on the requester OS and the object is an access target on the request destination OS;

a second step of, in response to the access request to access the object from the subject, causing proxy means on the request destination OS to issue a secondary access request;

a third step of causing the request destination OS to acquire the subject information on the subject OS from the subject information storage unit when the secondary access request is issued at the second step;

a fourth step of causing the request destination OS to convert the acquired subject information on the subject to secondary subject information having same format as original subject information on the proxy means; and a fifth step of causing the request destination OS to check whether the subject has a right to access the object based on the secondary subject information and on object information on the object.

10. The non-transitory computer readable medium according to any one of claim 7, 8, or 9,
wherein the requester OS and the request destination OS are caused to run on one information processing apparatus.

11. The non-transitory computer readable medium according to any one of claim 7, 8, or 9,
wherein the requester OS and the request destination OS are caused to run on different information processing apparatuses, respectively.

12. The non-transitory computer readable medium according to any one of claim 7, 8, or 9,
wherein one process on the request destination OS acts as a proxy of a process on the requester OS, an access control is exercised on the process on the request destination OS using an access control mechanism included in the request destination OS, and the process on the requester OS accesses a file on the request destination OS if approved.

* * * * *

UNITED STATES PATENT AND TRADEMARK OFFICE
CERTIFICATE OF CORRECTION

PATENT NO. : 8,336,059 B2  
APPLICATION NO. : 11/909299  
DATED : December 18, 2012  
INVENTOR(S) : Hieda Page 1 of 2

It is certified that error appears in the above-identified patent and that said Letters Patent is hereby corrected as shown below:

In the Specification

Column 14, Line 11: delete "101" and insert -- 202 --

Column 14, Line 24: delete "101" and insert -- 202 --

Column 14, Line 30: delete "If the requester OS 1 and the request destination OS 2 are caused to run on the same information processing apparatus in such an environment as the UML environment, the communication units A 104 and B 210 are not present. Due to this, the access processing means A 102 directly notifies the access request proxy means 202 on the request destination. OS 2 of the access request without via the communication units." and insert -- Referring to FIG. 7 and flowcharts of FIGS. 8 and 10, overall operation performed in the embodiment will next be described in detail. --

Column 14, Line 41: delete "101" and insert -- 202 --

Column 14, Line 42: delete "101" and insert -- 202 --

Column 14, Line 55: delete "The access processing means B 203 notifies the subject information conversion means 206 of the received access request (step S5)." and insert -- The subject information acquisition means 205 acquires the subject information on the access request means 101 from the subject information storage unit C 210, and notifies the subject information conversion means 206 of the acquired subject information (step S6). --

Column 16, Line 3: delete "When context switching occurs on the access processing means A 102, the subject information notification means 105 transmits subject information on a subject to be executed after switching to the access request proxy means 202 via the communication units A 104 and B 210." and insert -- In the first example, the UML is used as the requester OS 1. Due to this, among the constituent elements of the requester OS 1 shown in Fig. 1, the access request means 101 can be Signed and Sealed this  
Twenty-first Day of October, 2014

Michelle K. Lee  
*Deputy Director of the United States Patent and Trademark Office*

CERTIFICATE OF CORRECTION (continued)

U.S. Pat. No. 8,336,059 B2 regarded as an application process operating on the UML and the access request processing means A 102 as a UML kernel. --

Column 16, Line 26: delete "According to the addition, the access request proxy means 202 and the subject information acquisition means 205 operate differently from those according to the first preferred embodiment as follows." and insert -- Moreover, the subject information storage unit B 209 can be regarded as a subject information storage region B on the main memory, and SIDs (Security IDs) to be allocated by the SELinux are stored in the subject information storage region B. --

Column 16, Line 30: delete "Besides the operation described in the first preferred embodiment of the present invention, the access request proxy means 202 stores subject information in the subject information storage unit C 210 when receiving notification of the subject information from the subject information notification means 105 on the requester OS 1." and insert -- The SIDs means identifier information allocated by the SELinux to all subjects and objects on the OS, respectively. When a process accesses a file, the SELinux compares the SIDs respectively allocated to the process and the file with each other and conducts an access right check. --